United States Patent
Babicki et al.

(10) Patent No.: US 11,053,997 B2
(45) Date of Patent: Jul. 6, 2021

(54) APPARATUS FOR TORQUE LIMITING DEVICE

(71) Applicant: Hamilton Sundstrand Corporation, Charlotte, NC (US)

(72) Inventors: Kamil Babicki, Wysoka (PL); Anna Szewczyk, Pietrzykowice (PL); Pawel Skorupa, Wroclaw (PL); Piotr Zajac, Wroclaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 579 days.

(21) Appl. No.: 15/802,531

(22) Filed: Nov. 3, 2017

(65) Prior Publication Data
US 2018/0119763 A1    May 3, 2018

(30) Foreign Application Priority Data
Nov. 3, 2016  (EP) .................................... 16461567

(51) Int. Cl.
*F16D 41/00*  (2006.01)
*F16D 43/00*  (2006.01)
*F16D 67/02*  (2006.01)
*F16D 63/00*  (2006.01)
*F16D 41/066*  (2006.01)
*B64C 13/32*  (2006.01)
*F16D 41/067*  (2006.01)
(Continued)

(52) U.S. Cl.
CPC .............. *F16D 67/02* (2013.01); *B64C 13/32* (2013.01); *F16D 41/02* (2013.01); *F16D 41/066* (2013.01); *F16D 41/067* (2013.01); *F16D 63/006* (2013.01); *F16D 41/105* (2013.01); *F16D 43/208* (2013.01); *F16D 2066/003* (2013.01); *F16D 2127/004* (2013.01); *F16D 2127/005* (2013.01)

(58) Field of Classification Search
CPC .... F16D 41/066; F16D 41/067; F16D 41/088; F16D 41/10; F16D 41/105; F16D 43/208; F16D 43/204; F16D 43/20; F16D 66/003; F16D 66/006; F16D 2127/002; F16D 2127/005
USPC ....................................................... 192/223.2
See application file for complete search history.

(56) References Cited

U.S. PATENT DOCUMENTS 3,693,770 A  *  9/1972  Charchian ............... B65G 43/04
                                                              192/30 W
3,828,900 A  *  8/1974  Anderson ............. E21C 35/043
                                                               192/12 A
(Continued)

FOREIGN PATENT DOCUMENTS

| | | |
|---|---|---|
| EP | 0878635 A1 | 11/1998 |
| EP | 1236920 A1 | 9/2002 |
| SU | 1200021 A1 | 12/1985 |

OTHER PUBLICATIONS

Extended European Search Report for International Application No. 16461567.6 dated Apr. 18, 2017, 7 pages.

*Primary Examiner* — Charles A Fox
*Assistant Examiner* — Ryan P Dodd
(74) *Attorney, Agent, or Firm* — Cantor Colburn LLP

(57) ABSTRACT

The present disclosure relates to an apparatus for a torque limiter, comprising an indication device configured to provide an indication that the torque limiting device has tripped, and of the direction of torque applied to the torque limiting device when the torque limiting device tripped, in use.

10 Claims, 3 Drawing Sheets

(51) Int. Cl.
*F16D 41/02* (2006.01)
*F16D 43/208* (2006.01)
*F16D 41/10* (2006.01)
*F16D 66/00* (2006.01)
*F16D 127/00* (2012.01)

(56) References Cited

U.S. PATENT DOCUMENTS

| | | | |
|---|---|---|---|
| 3,835,967 A | | 9/1974 | Kerr |
| 4,273,227 A | * | 6/1981 | Grey .................... F16D 43/208 |
| | | | 192/150 |
| 4,454,504 A | | 6/1984 | Jocz |
| 4,909,364 A | * | 3/1990 | Grimm ................ F16D 11/14 |
| | | | 192/108 |
| 5,901,817 A | * | 5/1999 | Gitnes ................ F16D 43/206 |
| | | | 188/134 |
| 2002/0144876 A1 | * | 10/2002 | Harvey .................... F16D 7/08 |
| | | | 192/223.3 |
| 2007/0286743 A1 | * | 12/2007 | Ochab ................ F04B 1/0404 |
| | | | 417/313 |

\* cited by examiner

APPARATUS FOR TORQUE LIMITING DEVICE

FOREIGN PRIORITY

This application claims priority to European Patent Application No. 16461567.6 filed Nov. 3, 2016, the entire contents of which is incorporated herein by reference.

FIELD

The present disclosure relates generally to an apparatus for indicating when a torque limiting device has tripped, as well as in more specific embodiments a device for indicating the direction in which a torque limiting device has tripped.

BACKGROUND

Torque limiters are known in the art and comprise an input shaft or other drive member and an output shaft or other drive member. One or more coupling members may be provided to transmit torque from the input shaft to the output shaft. A number of systems are known in the art for preventing the overload of the coupling between the input shaft and the output shaft. These typically work by employing a brake that is activated once a predetermined torque limit is exceeded. This method of limiting torque is typically used in aircraft applications, for example when actuating an aircraft flight control surface, in order to protect the actuator from damage.

It is known to provide a device that indicates when a torque limiting device has been activated, or tripped during flight. It is desired to provide an improved method and apparatus for indicating when a torque limiting device has tripped or been activated.

SUMMARY

According to an aspect of the present disclosure, there is provided an apparatus for a torque limiter, comprising an indication device configured to provide an indication that the torque limiter has tripped, and of the direction of torque applied to the torque limiter when the torque limiter tripped, in use.

The apparatus may further comprise a movable component configured to move in first and second opposing directions based on the direction of torque applied to the torque limiter, wherein the movable component is connected to the indication device, such that, in use, the indication device moves or otherwise indicates the direction of torque applied to the torque limiter based on whether the movable component moves in the first or second direction.

The movable component may be a ring and the first and second opposing directions may correspond to clockwise and anti-clockwise rotational directions of the ring. The ring may be configured to rotate a limited amount in the clockwise and anti-clockwise directions. The apparatus may be configured such that the ring may travel a limited amount in the clockwise and anti-clockwise directions, but then be constrained from rotational movement after moving the limited amount.

For example, the ring may comprise a flange that sits within a circumferential pocket and is configured to slide within the pocket upon rotation of the ring. The circumferential pocket may extend around a circumferential portion of the ring and may comprise first and second circumferentially opposing surfaces configured to abut respective first and second surfaces of the flange. The circumferential pocket may extend around less than 50%, 40%, 30%, 20% or 10% of the circumference of the ring.

The indication device may comprise a rod configured to move in opposing axial directions based on whether the movable component moves in the first or second opposing direction.

The indication device and the movable component may be interconnected by a lever. The indication device and the movable component may be interconnected by a device (e.g., a lever) configured to amplify the movement of the movable component.

The apparatus may further comprise a housing, wherein the movable component and the indication device may be located within the housing. The housing may form part of a torque limiter.

The housing may comprise a hollow internal passage for housing the rotating components of the torque limiter (and optionally the torque limiter).

The housing may comprise a cylindrical passage within which the rod moves in the opposing axial directions. The longitudinal axis of the cylindrical passage may be normal to the longitudinal axis of the torque limiter.

The apparatus may further comprise one or more seals configured to fluidly seal the rod against the inner walls of the cylindrical passage.

According to an aspect of the present disclosure, there is provided a torque limiter comprising the apparatus described above. The torque limiter may comprise a rotational input drive member, a rotational output drive member co-axial with the input drive member, and one or more coupling members through which torque is transmitted from the input drive member to the output drive member.

A braking device may be attached to the input drive member or the output drive member and may be configured to restrict or prevent rotational movement of the torque limiter if the torque applied by the input drive member exceeds a given or predetermined amount. The braking device may comprise any of the apparatus for a torque limiter described above.

According to an aspect of the present disclosure, there is provided a method of using a torque limiter, wherein the torque limiter comprises a rotational input drive member, a rotational output drive member co-axial with the input drive member, and one or more coupling members through which torque is transmitted from the input drive member to the output drive member. The method comprises restricting or preventing rotational movement using a movable component configured to move in first and second opposing directions based on the direction of torque applied to the torque limiter, wherein the method comprises connecting the movable component to an indication device, such that, in use, the indication device moves (or otherwise indicates the direction of torque applied to the torque limiter) based on whether the movable component moves in the first or second direction.

According to an aspect of the present disclosure, there is provided a torque limiter, comprising: a rotational input drive member; a rotational output drive member co-axial with the input drive member; one or more coupling members through which torque is transmitted from the input drive member to the output drive member; and a braking device attached to the input drive member or the output drive member and configured to restrict or prevent rotational movement of the torque limiter if the torque applied by the input drive member exceeds a given or predetermined amount; wherein the braking device comprises a movable component configured to move in first and second opposing directions based on the direction of torque applied to the input drive member, and the movable component is connected to a rod configured to move in opposing axial directions based on whether the movable component moves in the first or second opposing direction.

BRIEF DESCRIPTION OF THE DRAWINGS

Various embodiments will now be described, by way of example only, and with reference to the accompanying drawings in which.

DETAILED DESCRIPTION

Figure 1:
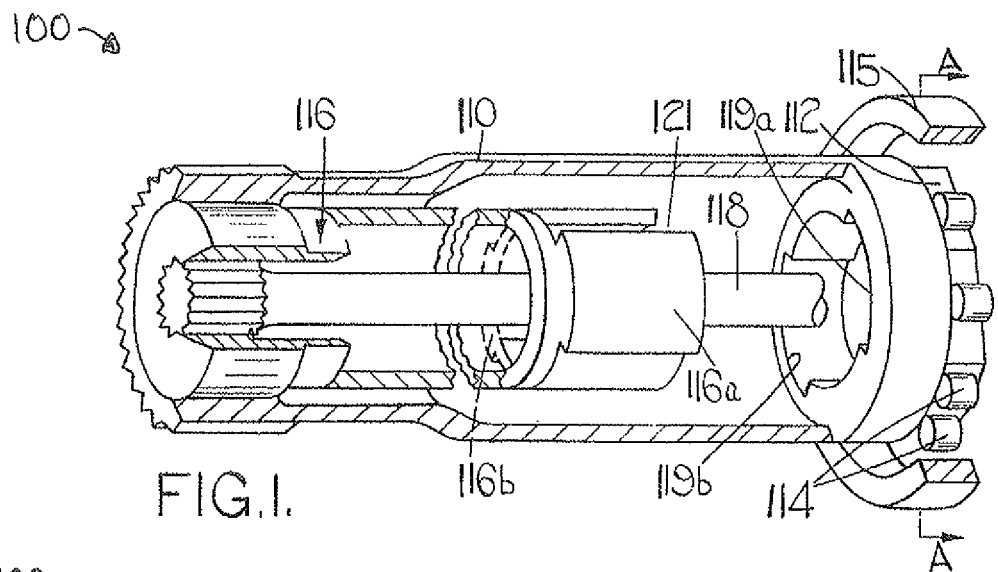
FIG. 1 shows a first perspective and cutaway view of a torque limiter.

The present disclosure relates generally to a trip indicator or device for indicating when a torque limiter has tripped, as well as in more specific embodiments a device for indicating the direction in which a torque limiter has tripped. The torque limiter may form part of an actuator, for example an actuator for an aircraft such as a flight control surface (e.g., flap, aileron) actuator.

An actuator may comprise a torque limiter which may generally include an input member and an output member, wherein the input member is rotatable about an axis and may form the input drive for the actuator. The output member may be rotatable about the same axis (i.e., co-axial with the input member) and may form the output drive for the actuator. A torque limiter may be referred to as a torque transmitting device, or a torque limiting device.

Many torque limiters are known and described in the art, and any of the conventional torque limiters can be used with the presently disclosed technology insofar as they are compatible therewith. One particular type of torque limiter 100 is described below and shown in FIGS. 1-3, although it will be appreciated that the broadest aspects of the present disclosure may involve the use of the trip indicator disclosed herein with any compatible torque limiter.

The torque limiter 100 comprises an input member 110 and an output member 111, as well as braking components, which include a cam 112 and surrounding roller cage 113. Rollers 114 are disposed between the cam 112 and the roller cage 113.

Rotation of the input member 110 causes a corresponding rotation in the output member 111 via one or more coupling members 116, 117. When torque is applied in a clockwise direction to the input member 110, torque may be transmitted through the one or more coupling members 116, 117 and a clockwise torque may be applied to the output member 111. Similarly, when torque is applied in an anti-clockwise direction to the input member, it may be transmitted through the coupling members 116, 117 so that an anti-clockwise torque is applied to the output member. The torque is applied through a torsion bar 118 that is pre-stressed to urge the coupling members 116, 117 into the limiting position shown in FIG. 3.

A stationary outer ring 115 (or other component that is fixed against rotation) surrounds the moving components and is essentially fixed against rotation, for example by connection to a housing.

The coupling member 117 is connected to the output shaft 111 and comprises fins 117a, 117b that are received in respective slots 121 in the end of the coupling member 116 (which is connected to the input shaft 110). The slots 121 permit a limited amount of angular movement between the members 116, 117. The coupling member 116 also comprises a pair of lobes 116a, 116b.

Figure 3:
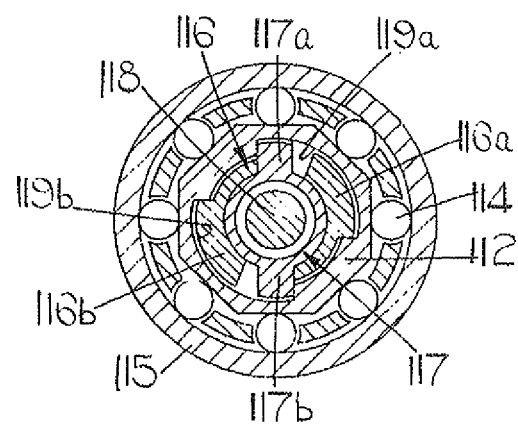
FIG. 3 shows a sectional view along line A-A of FIG. 1.

As shown in FIG. 3, one side of each lobe 116a, 116b and the opposite side of the associated one of the fins 117a, 117b engage opposite sides of an associated one of a pair of keyways 119a, 119b in the input member 110 inside the cam 112 and also engage a corresponding pair of keyways 120a, 120b in the output member 111. Keyways 119a, 120a are, as shown, normally aligned, as are keyways 119b, 120b.

When the applied torque is below a specified or predetermined amount, the input and output shafts 110, 111 may rotate relative to the stationary outer ring 115, as the relative angular movement of the coupling members 116, 117 does not exceed that permitted by the slots 121.

When the torque applied by the input member 110 exceeds the specified or predetermined amount, the applied torque may cause a brake to be applied. This can be effectuated using the stationary outer ring 115, or other component that is fixed against rotation.

Once the applied torque reaches or exceeds the specified or predetermined amount, the relative angular movement between the members 116, 117 exceeds that allowed by the slots 121, causing rotation of the cam 112, which then urges the rollers 114 outwardly into the stationary ring 115. This causes the rotating structure, including the input member 110, output member 111 and coupling members 116, 117 to be restrained against rotation by the stationary ring 115.

Figure 2:
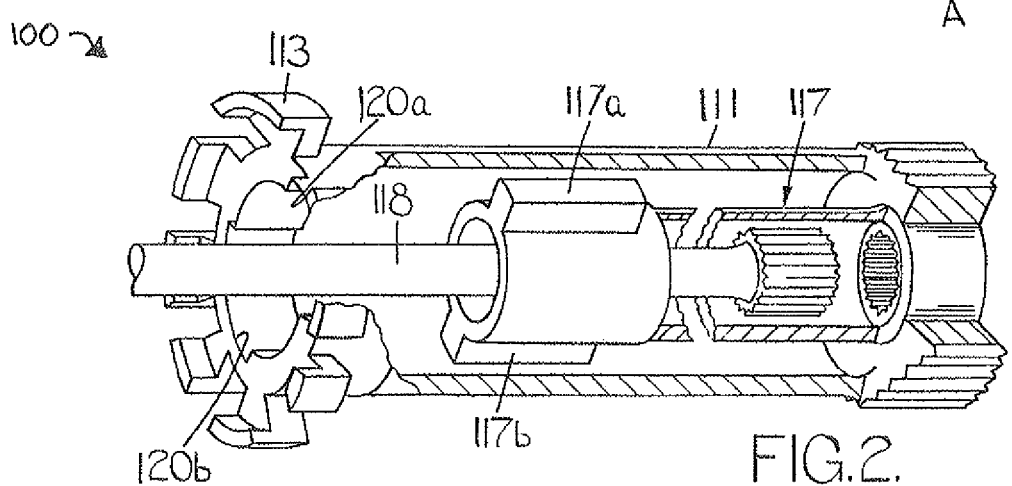
FIG. 2 shows a second perspective and cutaway view of the torque limiter of FIG. 1.

In the present disclosure the component that is fixed against rotation in a torque limiter (e.g., the stationary outer ring 115 in the exemplary torque limiter of FIGS. 1-3) is replaced by a movable component configured to move in first and second opposing directions by limited amounts, based on the direction of torque applied to the input member. For example, the movable component may be an outer ring that is permitted to rotate a limited amount in either the clockwise or anti-clockwise direction. The movable component may travel a limited amount in opposed directions, for example clockwise and anti-clockwise directions, but then be constrained from rotational movement after moving the limited amount in either direction (in order to provide the braking function).

As discussed in more detail below, it has been found that providing this movement allows the trip indicator to indicate the direction in which the torque limiter was rotating when it was tripped, whilst still providing the function of limiting torque by braking the rotation.

Figure 4:
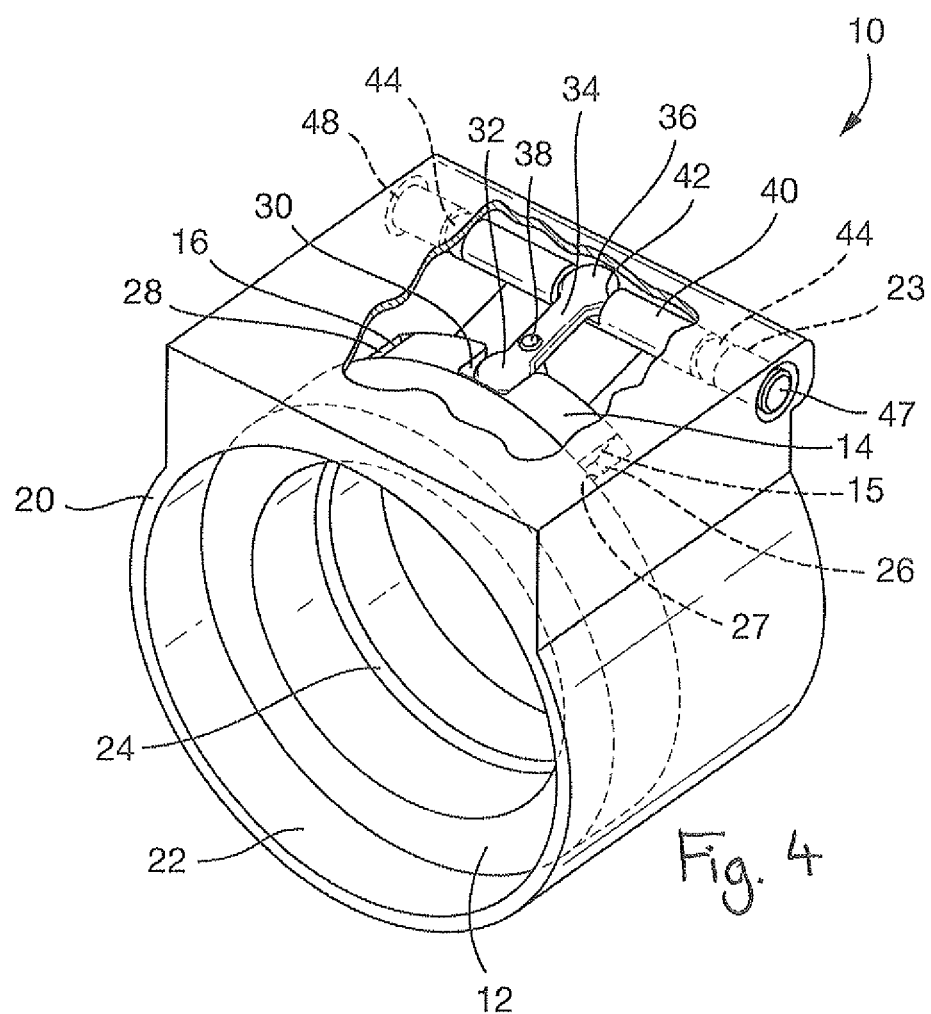
FIG. 4 shows an embodiment of a trip indicator for a torque limiting device in accordance with the present disclosure.

FIG. 4 shows an indication device 10 in accordance with one embodiment of the present disclosure.

The indication device 10 includes a movable component in the form of an outer ring 12 that is permitted to rotate a limited amount in clockwise and anti-clockwise directions. It will be appreciated that the indication device 10 may form part of a torque limiter comprising a number of rotational components located within the outer ring 12, for example the features of the torque limiter described above.

The outer ring 12 sits within a cylindrical cavity 22 of a housing 20 and may be pressed against a radial surface 24 of the housing in use. The outer ring 12 may be constrained against axial movement by one or more components, such as bearings (not shown) of the torque limiter that may also sit within the cylindrical cavity 22.

The outer ring 12 comprises an axial flange 14 that sits within a circumferential pocket 26 of the housing 20 and is configured to slide within the pocket 26 upon rotation of the outer ring 12. The pocket 26 extends around a circumferential portion of the outer ring 12 and comprises two circumferentially first and second opposing surfaces 27, 28 that are configured to abut respective first and second surfaces 15, 16 of the axial flange 14.

The axial flange 14 comprises a cavity 30 within which sits a first arm 32 of a lever 34. The lever 34 is configured to pivot about a fulcrum 38, such that movement of the axial flange 14 in a circumferential direction causes the lever 34 to pivot (rotate) about the fulcrum 38. The lever 34 comprises a second arm 36 opposed to the first arm 32 and configured to move in the opposite direction to the first arm 32 upon rotation of the lever 34.

An indicator bar 40 is slidably located within a cylindrical passage 23 of the housing 20, and comprises a cavity 42 within which sits the second arm 36 of the lever 34. Thus, movement of the second arm 36 of the lever 34 causes the indicator bar 40 to slide within the cylindrical passage 23 of the housing 20. Two seals 44, for example O-ring seals are configured to fluidly seal the interior of the torque limiter against the external environment.

The indicator bar 40 comprises first and second opposed ends 47, 48 that are configured, during normal operation, to remain within the cylindrical passage 23 of the housing 20. Upon movement of the indicator bar 40, one of the opposed ends 47, 48 will protrude from the housing 20 and the other of the opposed ends 47, 48 will travel further into cylindrical passage 23.

The amount of travel of the indicator bar 40 within the cylindrical passage 23 will be limited by the amount of travel of the axial flange 14 within the circumferential pocket 26. That is, the first opposed end 47 of the indicator bar 40 will stop protruding once the first surface 15 of the axial flange 14 abuts the first opposed surface 27 of the circumferential pocket 26, and the second opposed end 48 of the indicator bar 40 will stop protruding once the second surface 16 of the axial flange 14 abuts the second opposed surface 28 of the circumferential pocket 26.

The outer ring 12 may be configured to rotate, as governed by the amount of travel of the axial flange 14 within the circumferential pocket 26.

The seals 44 are configured to remain within the cylindrical passage 23 throughout all possible movement of the indicator bar 40 so that the sealing function provided by the seals 44 is never lost in use.

The indication device 10 as shown and described with reference to FIG. 4 provides not only an indication that the torque limiter has tripped, but also an indication of the direction of the trip (i.e., clockwise or anti-clockwise). Moreover, the indication device 10 provides this indication whilst fluidly sealing the torque limiter.

Figure 5:
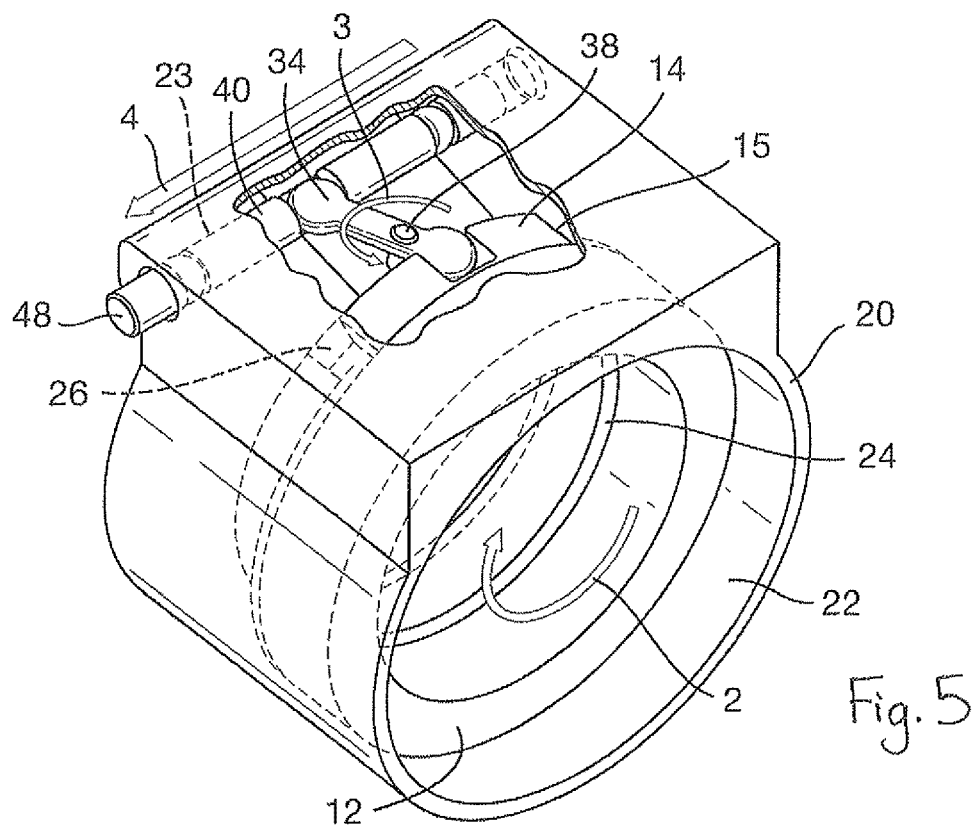
FIG. 5 shows the trip indicator of FIG. 4 when indicating movement of a shaft in a clockwise direction.

As shown in FIG. 5 upon rotation of the outer ring 12 in a first rotational direction (e.g., clockwise) as indicated by the arrow 2, the axial flange 14 moves within the pocket 26 until the first end 15 of the axial flange 14 abuts the first opposing surface 27 of the pocket 26. At this point the outer ring 12 (and also the rotating components of the torque limiter) is constrained against further rotation.

The movement of the axial flange 14 causes the lever 34 to pivot or rotate about the fulcrum 38, as indicated by arrow 3. This, in turn, causes the indicator bar 40 to slide within the cylindrical passage 23 as indicated by arrow 4, such that the second end 48 of the indicator bar 40 protrudes from the cylindrical passage 23. An operator or repair technician can quickly determine that the torque limiter has locked against rotation (i.e., tripped) and also that the torque was applied in a clockwise direction when it was locked.

Figure 6:
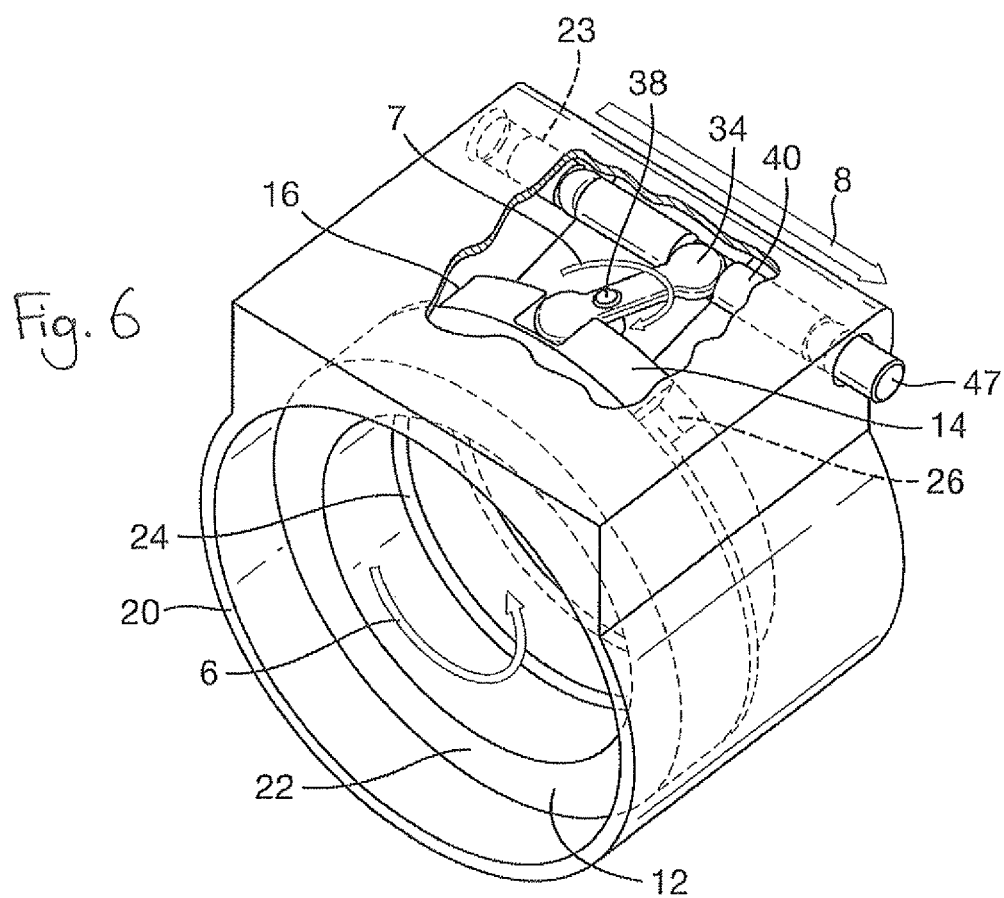
FIG. 6 shows the trip indicator of FIG. 4 when indicating movement of a shaft in an anti-clockwise direction.

As shown in FIG. 6 upon rotation of the outer ring 12 in a second, opposite rotational direction (e.g., anti-clockwise) as indicated by the arrow 6, the axial flange 14 moves within the pocket 26 (in the opposite direction to when the outer ring 12 rotated in the clockwise direction) until the second end 16 of the axial flange 14 abuts the second opposing surface 28 of the pocket 26. At this point the outer ring 12 (and also the rotating components of the torque limiter) is constrained against further rotation.

The movement of the axial flange 14 causes the lever 34 to pivot or rotate about the fulcrum 38, as indicated by arrow 7. This, in turn, causes the indicator bar 40 to slide within the cylindrical passage 23 (in the opposite direction to when the outer ring 12 rotated in the clockwise direction) as indicated by arrow 8, such that the first end 47 of the indicator bar 40 protrudes from the cylindrical passage 23. An operator or repair technician can quickly determine that the torque limiter has locked against rotation (i.e., tripped) and also that the torque was applied in an anti-clockwise direction when it was locked.

The technology disclosed in the above embodiments can assist an operator when reviewing the torque limiter by providing an easily discernible (and mechanical) indication that the torque limiter has tripped, as well as the direction the torque limiter was rotating when it was tripped. These advantages can be achieved also in the broadest aspects of the present disclosure, which in various embodiments relate to an indication device for a torque limiter that is able to indicate the direction of rotation of the torque member when it was tripped, or when the brake was otherwise applied.

This also provides an advantage if using multiple torque limiters, as is frequently the case when dealing with actuators for aircraft control surfaces. Providing an indication device as disclosed herein for a multiple of actuators means that the actuator that has tripped can be easily identified, and the problem that caused it to trip can be more quickly uncovered, in that the indication device indicates whether it was extending or retracting at the time of tripping (i.e., corresponding to a clockwise or anti-clockwise rotation).

The indicator 40 can also be reset easily, by pressing the indicator bar 40 back into the circumferential passage 23.

Various changes in detail may be made to the indication device as described above, whilst still achieving the advantages stated herein. For example, a lever as shown in the embodiment of FIGS. 1-3 can be advantageous in that it means a small rotation of the outer ring 12 leads to a relatively large amount of travel of the indicator bar 40. In general, although the present invention has been described with reference to various embodiments, it will be understood by those skilled in the art that various changes in form and detail may be made without departing from the scope of the invention as set forth in the accompanying claims.

The invention claimed is:

1. An apparatus for a torque limiter, comprising:
   an indication device configured to provide an indication that the torque limiter has tripped, and of the direction of torque applied to the torque limiter when the torque limiter tripped, in use; and a movable component configured to move in first and second opposing directions based on the direction of torque applied to the torque limiter, wherein the movable component is connected to the indication device, such that, in use, the indication device moves or otherwise indicates the direction of torque applied to the torque limiter based on whether the movable component moves in the first or second direction;

wherein said indication device and said movable component are interconnected by a lever configured to pivot about a fulcrum to amplify the movement of the movable component.

2. An apparatus as claimed in claim 1, wherein the movable component is a ring and the first and second opposing directions correspond to clockwise and anti-clockwise rotational directions of the ring.

3. An apparatus as claimed in claim 1, wherein the indication device comprises an indicator bar configured to move in opposing axial directions based on whether the movable component moves in said first or second opposing direction.

4. An apparatus as claimed in claim 1, wherein the device configured to amplify the movement of the movable component comprises a lever.

5. An apparatus as claimed in claim 4, further comprising a housing, wherein the movable component and the indication device are located within the housing.

6. An apparatus as claimed in claim 5, wherein said housing comprises a hollow internal passage for housing the rotating components of said torque limiter.

7. An apparatus as claimed in claim 3, wherein said housing comprises a cylindrical passage within which said indicator bar moves in said opposing axial directions.

8. An apparatus as claimed in claim 7, further comprising one or more seals configured to fluidly seal said indicator bar against the inner walls of said cylindrical passage.

9. A torque limiter, comprising:
a rotational input drive member;
a rotational output drive member co-axial with said input drive member;
one or more coupling members through which torque is transmitted from the input drive member to the output drive member; and a braking device attached to said input drive member or said output drive member and configured to restrict or prevent rotational movement of the torque limiter if the torque applied by said input drive member exceeds a given or predetermined amount;

wherein said braking device comprises a movable component configured to move in first and second opposing directions based on the direction of torque applied to the input drive member, and the movable component is connected to an indicator bar configured to move in opposing axial directions based on whether the movable component moves in said first or second opposing direction;

wherein said indication bar and said movable component are interconnected by a lever configured to pivot about a fulcrum to amplify the movement of the movable component.

10. A method of using a torque limiter, wherein the torque limiter comprises a rotational input drive member, a rotational output drive member co-axial with the input drive member, and one or more coupling members through which torque is transmitted from the input drive member to the output drive member, the method comprising:

restricting or preventing rotational movement using a movable component configured to move in first and second opposing directions based on the direction of torque applied to the torque limiter; and connecting the movable component to an indication device, such that, in use, the indication device moves or otherwise indicates the direction of torque applied to the torque limiter based on whether the movable component moves in the first or second direction, wherein the movable component is configured to move in first and second opposing directions based on the direction of torque applied to the torque limiter, wherein the movable component is connected to the indication device by a lever configured to pivot about a fulcrum to amplify the movement of the movable component.

* * * * *